United States Patent
Arnold et al.

(10) Patent No.: US 6,885,963 B2
(45) Date of Patent: Apr. 26, 2005

(54) METHOD FOR TESTING A PROGRAM-CONTROLLED UNIT BY AN EXTERNAL TEST DEVICE

(75) Inventors: Ralf Arnold, Poing (DE); Thorsten Klose, München (DE); Ernst-Josef Kock, Kichseeon (DE)

(73) Assignee: Infineon Technologies AG, Munich (DE)

( * ) Notice: Subject to any disclaimer, the term of this patent is extended or adjusted under 35 U.S.C. 154(b) by 375 days.

(21) Appl. No.: 09/939,250

(22) Filed: Aug. 24, 2001

(65) Prior Publication Data

US 2002/0065624 A1 May 30, 2002

(30) Foreign Application Priority Data

Aug. 24, 2000 (DE) .......................................... 100 41 697

(51) Int. Cl.[7] .............................................. G05B 19/14
(52) U.S. Cl. ...................................... 702/120; 702/122
(58) Field of Search .................................. 702/117–123

(56) References Cited

U.S. PATENT DOCUMENTS

| | | | | |
|---|---|---|---|---|
| 4,305,125 A | * | 12/1981 | Sato et al. ...................... 714/25 |
| 4,975,641 A | * | 12/1990 | Tanaka et al. ............... 324/763 |
| 5,226,149 A | * | 7/1993 | Yoshida et al. ................ 714/25 |
| 5,228,139 A | * | 7/1993 | Miwa et al. ................... 714/27 |
| 5,291,425 A | * | 3/1994 | Nagaishi ........................ 716/4 |
| 5,359,547 A | * | 10/1994 | Cummins et al. ........... 702/119 |
| 5,416,919 A | * | 5/1995 | Ogino et al. ................... 714/30 |
| 5,519,715 A | | 5/1996 | Hao et al. |
| 5,544,311 A | * | 8/1996 | Harenberg et al. ............. 714/40 |
| 5,557,558 A | * | 9/1996 | Daito .......................... 702/120 |
| 5,657,330 A | * | 8/1997 | Matsumoto ................. 714/733 |
| 5,900,739 A | * | 5/1999 | Gaglani ...................... 324/765 |
| 5,940,783 A | * | 8/1999 | Kukutsu et al. ............. 702/120 |
| 5,982,188 A | * | 11/1999 | Lysinger ..................... 324/763 |
| 6,003,142 A | | 12/1999 | Mori |
| 6,125,456 A | * | 9/2000 | Takahashi ..................... 714/25 |
| 6,158,021 A | * | 12/2000 | Ziegler et al. ................ 714/25 |
| 6,229,328 B1 | * | 5/2001 | Lueders ....................... 324/765 |
| 6,591,389 B1 | * | 7/2003 | Daudelin et al. ........... 714/733 |
| 2003/0182084 A1 | * | 9/2003 | Tanaka et al. .............. 702/184 |

FOREIGN PATENT DOCUMENTS

| | | | |
|---|---|---|---|
| DE | 19947603 A1 | * | 4/1999 |
| DE | 198 33 208 C 1 | | 10/1999 |
| DE | 198 35 258 A 1 | | 2/2000 |
| EP | 0332727 | * | 9/1989 |
| EP | 0 605 091 A2 | | 7/1994 |

* cited by examiner

Primary Examiner—Marc S. Hoff
Assistant Examiner—Craig Steven Miller
(74) Attorney, Agent, or Firm—Laurence A. Greenberg; Werner H. Stemer; Gregory L. Mayback

(57) ABSTRACT

A method described is distinguished by the fact that an external test device brings about the execution, in a program-controlled unit, of a program that initiates, performs or supports the testing of the program-controlled unit. As a result, program-controlled units can be rapidly and reliably tested under all circumstances with minimal outlay.

26 Claims, 1 Drawing Sheet

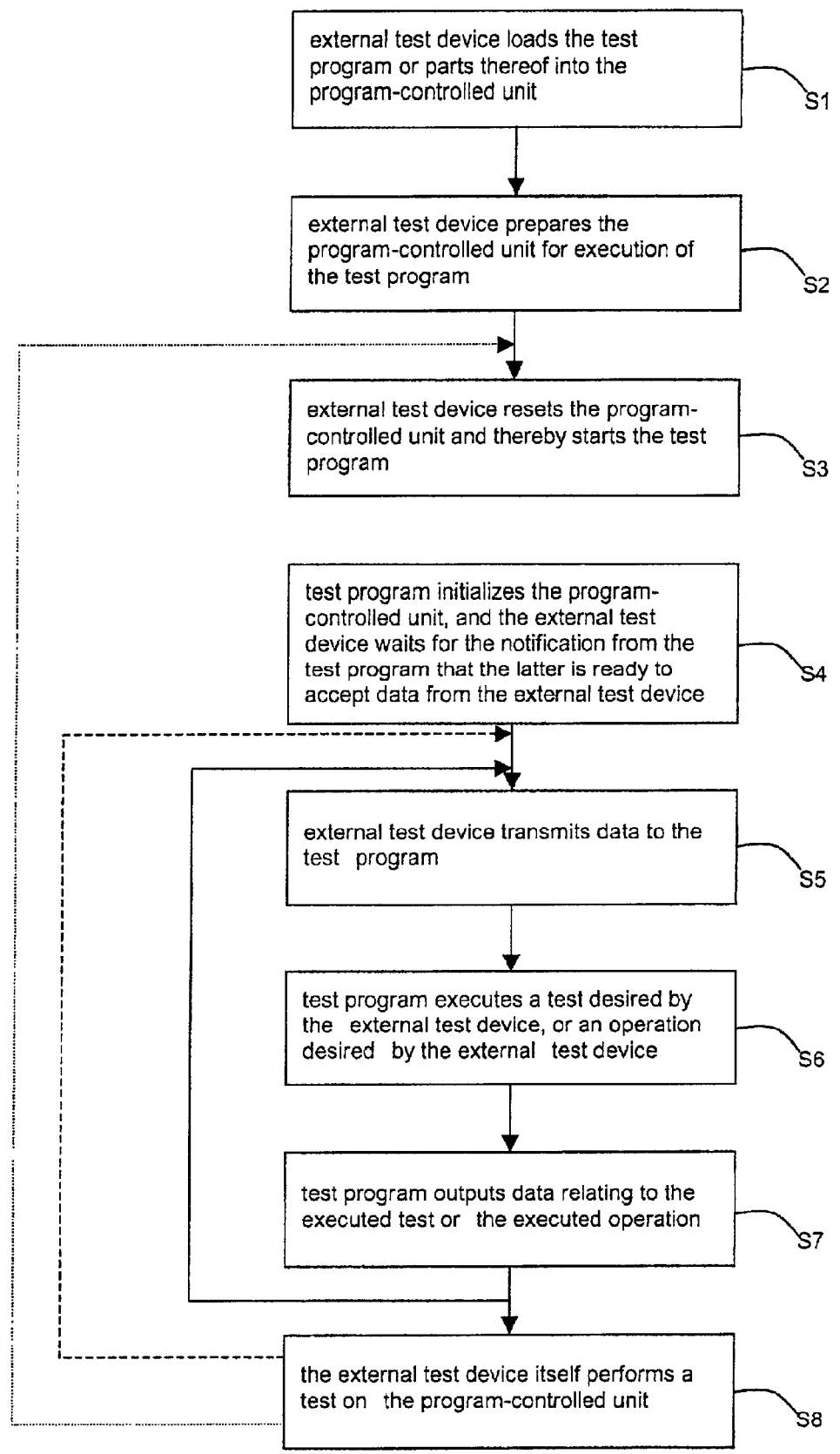

METHOD FOR TESTING A PROGRAM-CONTROLLED UNIT BY AN EXTERNAL TEST DEVICE

BACKGROUND OF THE INVENTION

Field of the Invention

The present invention relates to a method for testing a program-controlled unit by an external test device.

Program-controlled units such as, for example, microprocessors, microcontrollers and signal processors, but also other modules containing integrated circuits are usually tested after their production.

The initiation or the performance of such tests, and the evaluation of the test results obtained in the process, are generally effected by an external test device.

There are a number of possibilities for testing the program-controlled unit by the external test device.

A first possibility consists in the external test device applying to input and/or output terminals of the module to be tested specific signals or signal sequences which stimulate the circuit contained in the module or specific parts of the circuit, and registering the conditions established as a reaction to this at the input and/or output terminals, comparing them with defined desired reactions, and, depending on the comparison result, defining whether or not the module is fault-free.

Such a test method has a whole series of disadvantages. One of the disadvantages is that it is difficult to determine suitable signals or signal sequences, which stimulate the module to be tested, and the desired reactions thereto. This is generally done using a simulation program, but it must additionally be taken into account that even modules which can be classified as fault-free behave differently to a certain extent, for example do not have exactly the same signal propagation times. Both the simulation of the module behavior and the taking account of permissible tolerances are very complicated and costly.

A further disadvantage of the test method mentioned above is that the external test devices occasionally cannot operate rapidly enough to be able to perform the test at the maximum operating frequency of the module to be tested. In other words it has to be accepted that the module, even though it has been classified as fault-free, nonetheless does not operate in a fault-free manner in practice.

A further possibility for the testing of a program-controlled unit or of some other module by an external test device consists in integrating into the module a self-test device by which the module can test individual, a plurality or all of the components itself. Such self-test devices are, for example, the so-called built-in-self-test (BIST) modules. When the BIST module is present in the module to be tested, the task of the external test device can at least partly be restricted to an initiation of the test by the BIST module and the evaluation of the test results supplied by the BIST module. However, BIST modules can only test specific modules or module components such as, for example, memory modules, with the result that, at least in the case of program-controlled units, it is still necessary to make use of the first test method described above. Irrespective of this, the presence of BIST modules also requires a high outlay. An additional hardware component is involved, as a result of which the modules equipped therewith are made larger and have a more complicated construction than modules without BIST modules. Furthermore, BIST modules cannot be used flexibly: alterations to the test or test sequence performed by the BIST module can only be realized by a correspondingly altered BIST module, which is associated with a considerable outlay in respect of costs and time.

A further possibility for testing the program-controlled unit or of some other module by the external test device consists in the performance of a so-called scan test. However, scan tests do not enable a complete test; one or more of the tests mentioned above additionally have to be performed.

SUMMARY OF THE INVENTION

It is accordingly an object of the invention to provide a method for testing a program-controlled unit by an external test device which overcomes the above-mentioned disadvantages of the prior art methods of this general type, in which the program-controlled units to be tested by the method can be rapidly and reliably tested under all circumstances with a low outlay.

With the foregoing and other objects in view there is provided, in accordance with the invention, a method for testing a program-controlled unit. The method includes providing an external test device that brings about an execution, in the program-controlled unit, of a program that initiates, performs or supports the testing of the program-controlled unit.

Accordingly, the method according to the invention is distinguished by the fact that the external test device brings about the execution, in the program-controlled unit, of the program, which initiates, performs or supports the testing of the program-controlled unit. This proves to be advantageous in multiple respects. In particular, this results in that the program-controlled unit can be comprehensively tested by the external test device of comparatively simple construction under real conditions. Additional or altered tests can be carried out on the program-controlled unit with no appreciable outlay. The program-controlled unit can be tested without difficulty by different external test devices, and the external test device can be used without difficulty for testing different program-controlled units.

By the method of the invention, program-controlled units to be tested can be rapidly and reliably tested under all circumstances with a low outlay.

The method described below is used, in particular, to check program-controlled units such as microprocessors, microcontrollers, signal processors, etc. for freedom from faults, more precisely for freedom from hardware faults, before or immediately after their completion.

The test is usually effected before the integrated circuit which forms the program-controlled unit is processed further by integration into a housing or by its encapsulation with a compound that forms a housing, to give the finished device.

Preferably, the test is carried out as early as a point in time when the integrated circuits to be tested are still situated on the wafer on which they were produced.

However, the method can also be employed on the finished end product and at any other points in time, indeed even with program-controlled units that are already in use.

The method described below is referred to as a software implemented self test (SIST). In this method, although an external test device is still used, and the external test device is also connected, as before, via needles or other contact elements to selected or all input/output terminals (pads or pins) of the program-controlled unit to be tested, the external test device nonetheless operates differently from external test device used heretofore.

The SIST method is distinguished by the fact that the external test device brings about the execution, in the program-controlled unit, of a program, referred to as test program below, which initiates, performs or supports the testing of the program-controlled unit.

The test program to be executed by the program-controlled unit can be loaded in the program-controlled unit as early as during the production thereof (for example be stored in a ROM contained in the program-controlled unit by a corresponding configuration of the ROM), or be loaded into an internal program memory of the program-controlled unit by the external test device via a suitable loading interface, for example the so-called JTAG interface. In which case the program memory may be either a special test program memory or the "normal" program memory in which the user programs for normal operation of the program-controlled unit are also stored, and in which case the program memory may optionally be a volatile memory (e.g. a RAM) or a non-volatile memory (e.g. an OTP-ROM, an EPROM, an EEPROM or a flash memory). In the loading process the whole program or parts of the program may be loaded.

For the case where the test program is stored in a non-volatile memory (ROM, OTP-ROM, EPROM, EEPROM, flash memory, etc.) of the program-controlled unit, it proves to be advantageous if the test program, during execution, calls or can call at least one subroutine stored in a non-volatile memory. This opens up the possibility for also enabling a test program stored in a non-volatile memory to be corrected, modified, or extended, and for corrections, changes and extensions that have been carried out to be of a permanent nature through reprogramming of a non-volatile memory of the program-controlled unit which stores the main program or other subroutines.

In the example considered, execution of the test program is brought about by the program-controlled unit being reset after the creation of the preconditions necessary for execution of the test program (for example after the loading of the test program into the program-controlled unit and/or after the setting of the instruction pointer to a predetermined value, and/or after the mapping of the memory storing the test program onto a specific address range). In this case, care must be taken to ensure that the resetting of the program-controlled unit does not reverse the preparations made beforehand for execution of the test program; if appropriate, a special (test) resetting operation must be performed.

What is effected by the execution of the test program depends on the test which is to be initiated, performed or supported by the test program.

One possibility is that the test program puts the program-controlled unit "only" into a specific state, which it has to be in, in order that the external test device can perform specific tests or measurements; a further possibility is for the test program itself to perform or initiate one or a plurality of specific tests (for example a memory test).

Although not absolutely necessary, it nonetheless proves to be advantageous if the test program and the external test device communicate with one another. In the example considered, the communication is effected via specific input and/or output terminals of the program-controlled unit, in which case the input and/or output terminals are input and/or output terminals which have other functions during normal operation of the program-controlled unit. That is to say constitute an interface defined by the test program, and are repeatedly interrogated by the test program at least at the times at which the test program is ready to accept data, in order to be able to accept supplied data. Alternatively, the input and/or output terminals can also form the interface (for example an SSC interface) during normal operation of the program-controlled unit. In addition, the communications can occur via registers of the program-controlled unit that can be written to and/or read from by the external test device.

The data fed to the program-controlled unit and/or the data output by the program are preferably held stably over a plurality of internal clock cycles of the program-controlled unit and/or of the external test device. As a result, the data can be reliably accepted from the respective receiver even when the internal clock signals of the program-controlled unit and of the external test device have different frequencies and/or different phase angles.

The communication contains a notification from the test program to the external test device that it is ready to accept data. The feeding of data from the external test device to the test program, the data controlling the sequence of the test program and thus defining the tests and/or operations to be executed, initiated or supported by the test program. Alternatively, the data can be taken into account or used during the execution, initiation, or support of the tests or operations to be performed, and notifications from the test program to the external test device about the beginning, the continuation, the end, and/or the results of the respective tests and operations are provided.

It may also be provided that the test program also outputs data that are suitable as input signals for a device which carries out a repair of the program-controlled unit, such as, for example, a laser cutter or some other device by which defective parts of the program-controlled unit can be deactivated and/or redundant parts can be activated. Such a repair device can be connected to the program-controlled unit and obtain the data intended for it, like the external test device, directly from the program-controlled unit. However, the repair device may also be supplied with the information or instructions necessary for the repair by the external test device.

Irrespective of this, it may be provided that the test program, upon identification of a fault, waits until the repair device has attempted to rectify the fault, and then checks whether the repair was successful.

Other features which are considered as characteristic for the invention are set forth in the appended claims.

Although the invention is illustrated and described herein as embodied in a method for testing a program-controlled unit by an external test device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a flow chart of an exemplary method for testing a program-controlled unit by an external test device according to the invention.

DESCRIPTION OF THE PREFERRED EMBODIMENTS

Referring now to the single FIGURE of the drawing in detail, there is shown an exemplary test operation that begins by an external test device loading a test program or parts thereof into a program-controlled unit (step S1).

In the next step (step S2), by application of specific signals to specific input and/or output terminals, the program-controlled unit is put into a state, which the program-controlled unit must be in, in order to be able to be tested by the test program.

Afterward, the program-controlled unit is reset by the external test device, whereupon (after the cancellation of the reset signal) the program-controlled unit starts to execute the test program (step S3).

After the resetting of the program-controlled unit, the external test device waits for a message from the test program that the latter is ready to accept instructions by the external test device (step S4). The test program started by the resetting of the program-controlled unit initializes the program-controlled unit and then reports that it is ready to accept instructions from the external test device. The message includes data that contain one or a plurality of bits and are output by the test program via input and/or output terminals of the program-controlled unit which are defined in the test program itself or in step S2. The external test device monitors the relevant input and/or output terminals of the program-controlled unit and checks whether the data output via the latter signal the readiness of the test program to accept data.

As soon as the test program is ready to accept instructions, the control of the test operation passes completely to the external test device: henceforth the latter determines which tests are to be carried out, and when and how this shall be done.

If the external test device ascertains that the test program is ready to accept data, it communicates data intended for the test program to specific input and/or output terminals of the program-controlled unit (step S5). In the example considered, the data include data which—by a corresponding control of the sequence of the test program—determine the tests or the operations which are intended to be executed by the test program, and, if appropriate, further data or parameters using which the respective test or the respective operation is intended to be carried out. In the example considered, the tests or the operations which can be executed by the test program and for whose execution the test program can be initiated by the external test device are tests of various internal memories, the test of an A/D converter, the test of a CAN controller, the test of an instruction cache, and the test of the power management. The additional data or parameters are, for example, analog values to be converted by the A/D converter, or bit patterns, using which a memory test is to be performed. It should be apparent that—provided that the test program is able to do so—any other tests can also be commanded, and the additional data or parameters may also be any other data or parameters. The input and/or output terminals of the program-controlled unit to which the external test device feeds the abovementioned data are input and/or output terminals which are defined in the test program or in step S2. The test program repeatedly interrogates (polling) the terminals at times when it can accept inputs from the external test device.

Afterward (in step S6), the test program executes the test or the operation to which it has been instructed by the external test device.

After the execution of the test or operation, the test program notifies the external test device, via specific input and/or output terminals of the program-controlled unit, of the effected execution of the test and/or the test result and also, if appropriate, more detailed information about faults that occurred (for example which memory cell did not output again the value written to it, and/or what value the relevant memory cell output instead), or the execution of the operation (step S7). The input and/or output terminals via which this notification is effected are determined by a corresponding definition in the test program or in step S2.

What happens after step S7 depends on the action that had to be executed by the test program.

If the test program had to execute a test, the external test device accepts the test results and the further information obtained, if appropriate, and evaluates them immediately or later, and a return is made to step S5, where the external test device outputs new instructions for the test program (the information output to the external test device in step S7 simultaneously constitutes an indication for the external device that the test program is ready to accept new instructions).

If the test program was intended to put the program-controlled unit "only" into a specific state, the external test device, after step S7, can, in a step S8, perform the tests which have to be performed in this state (by way of example, the external test device can then measure the current taken up by the program-controlled unit after the latter has been put into an energy-saving operating mode, for example into the so-called sleep mode or into the so-called power-down mode, by the test program). A return is subsequently made— if appropriate after the program-controlled unit has been restored to the previous state—to step S5, where the program-controlled unit outputs new instructions for the test program, or a return is subsequently made, if it is no longer possible, or no longer readily possible, to restore the program-controlled unit to the previous state, to step S3, as a result of which the program-controlled unit is reset and the test program is started anew.

The test sequence illustrated in the FIGURE is only one of many possibilities for testing a program-controlled unit according to the SIST method. Some of the possible modifications or alternatives have already been mentioned above; it should be apparent that there is a virtually unlimited number of possible further modifications or alternatives.

Depending on the type of tests or operations to be performed, it may be necessary or useful to integrate into the program-controlled unit special modules which can be activated by the test program and accelerate or support the test sequence. These include, for example, a module, which modifies the addressing of a memory to be tested in accordance with an internal address assignment or generates specific bit patterns (e.g. bit patterns required for checkerboard tests) and uses them for writing to the memory to be tested.

Ultimately, by the method described, program-controlled units can be rapidly and reliably tested under all circumstances which a minimal outlay.

The test program can also be used for operating the program-controlled unit during the so-called burn-in and/or during life tests. In this case, the test program is preferably made to repeat the tests or operations, which it can initiate, perform or support at least partly in a defined or random order.

We claim:

1. A method for testing a program-controlled unit having a test program associated therewith, which comprises the steps of:

providing an external test device for executing, in the program-controlled unit, the test program which at least one of initiates, performs and supports the testing of the program-controlled unit;

starting the test program by resetting the program-controlled unit; and checking the readiness of the test program to accept data.

2. The method according to claim 1, which comprises performing the testing of the program-controlled unit to check the program-controlled unit for hardware faults.

3. The method according to claim 1, which comprises performing the testing one of during and immediately after a production of the program-controlled unit.

4. The method according to claim 1, which comprises loading one of the test program and parts of the test program into the program-controlled unit using the external test device.

5. The method according to claim 4, which comprises storing one of the test program and the parts of the test program in a nonvolatile memory of the program-controlled unit during a production of the program-controlled unit.

6. The method according to claim 5, which comprises the test program calling at least one subroutine stored in the nonvolatile memory.

7. The method according to claim 1, which comprises setting up the external test device and the test program so as to communicate with one another.

8. The method according to claim 7, which comprises effecting the communication using at least one of input terminals and output terminals of the program-controlled unit, and in that the program, at least at times at which the test program is ready to accept data, the test program repeatedly interrogates at least one of the input terminals and the output terminals through which the data can be fed to the test program in order to accept the data fed to at least one of the input terminals and the output terminals.

9. The method according to claim 8, which comprises effecting the communication through an interface of the program-controlled unit that is defined by the test program.

10. The method according to claim 8, which comprises setting up at least one of the input terminals and the output terminals the program-controlled unit through which the communication is effected to be the input terminals and the output terminals which have other functions during normal operation of the program-controlled unit.

11. The method according to claim 8, wherein the input terminals and the output terminals used for the communications form an interface during normal operation of the program-controlled unit.

12. The method according to claim 8, which comprises holding stably the data fed to at least one of the input terminals and output terminals of the program-controlled unit and the data output from at least one of the input terminals and the output terminals of the program-controlled unit over a plurality of internal clock cycles of at least one of the program-controlled unit and of the external test device.

13. The method according to claim 7, which comprises effecting the communication using registers of the program-controlled unit which can be at least one of written to and read from by the external test device.

14. The method according to claim 7, which comprises operating the test program in a manner dependent on data which are fed to the program-controlled unit by the external test device.

15. The method according to claim 7, which comprises using corresponding data output from the program-controlled unit to signal to the test program that the program-controlled unit is ready to accept additional data.

16. The method according to claim 7, wherein the external test device controls a sequence of the test program by feeding data to the program-controlled unit.

17. The method according to claim 16, wherein by controlling the sequence of the program, the external test device determines what tests or operations are initiated, performed or supported by the test program.

18. The method according to claim 17, wherein the tests or the operations are initiated, performed, or supported using or taking account of additional data which are fed to the program controlled unit by the external test device.

19. The method according to claim 17, which comprises the test program outputting to the external test device further data relating to at least one of an execution and a result of the tests.

20. The method according to claim 17, which comprises outputting additional data suitable as input signals for a device performing a repair of the program-controlled unit from the test program to the device.

21. The method according to claim 20, which comprises outputting the additional data directly from the test program to the device performing the repair.

22. The method according to claim 20, which comprise checking whether the repair was successful after a completion of the repair.

23. The method according to claim 1, which comprises using the test program to activate component parts of the program-controlled unit which one of accelerate and support a sequence of a test or a performance of an operation.

24. The method according to claim 1, which comprises at least partly repeating in one of a defined order and a random order tests and operations which can be one of initiated, performed and supported by the test program.

25. The method according to claim 17, which comprises the test program outputting to the external test device further data relating to at least one of an execution and a result of the operations.

26. The method according to claim 17, which comprises the test program outputting further data relating to a least of an execution and a result of one of the tests and the operations to be fetched by the external test device.

* * * * *